(12) United States Patent
Groff et al.

(10) Patent No.: US 8,097,978 B2
(45) Date of Patent: Jan. 17, 2012

(54) EXTENDING BACKUP TIMES OF UNINTERRUPTIBLE POWER SUPPLIES

(75) Inventors: Steven Mark Groff, Tucson, AZ (US); Trung Le, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 313 days.

(21) Appl. No.: 12/174,425

(22) Filed: Jul. 16, 2008

(65) Prior Publication Data

US 2010/0013314 A1    Jan. 21, 2010

(51) Int. Cl.
   *H02J 1/10*    (2006.01)
   *H02J 3/38*    (2006.01)
   *H02J 7/34*    (2006.01)

(52) U.S. Cl. .................. 307/18; 363/37; 713/300

(58) Field of Classification Search .......... 307/18
   See application file for complete search history.

(56) References Cited

U.S. PATENT DOCUMENTS

| | | | |
|---|---|---|---|
| 4,659,942 A * | 4/1987 | Volp .................. 307/19 |
| 4,698,738 A * | 10/1987 | Miller et al. ........... 363/65 |
| 4,760,276 A * | 7/1988 | Lethellier ............. 307/18 |
| 5,381,554 A * | 1/1995 | Langer et al. .......... 714/14 |
| 5,610,451 A * | 3/1997 | Symonds ............. 307/66 |
| 5,798,578 A * | 8/1998 | Thereze ............. 307/18 |
| 5,920,129 A | 7/1999 | Smith |
| 6,041,414 A * | 3/2000 | Kikuchi ............. 713/300 |
| 6,137,280 A * | 10/2000 | Ackermann et al. ....... 323/354 |
| 6,166,531 A | 12/2000 | Hogan et al. |
| 6,181,029 B1 | 1/2001 | Berglund et al. |
| 6,288,549 B1 * | 9/2001 | Chatelain ............. 324/426 |
| 6,304,006 B1 * | 10/2001 | Jungreis ............. 307/64 |
| 6,773,849 B2 * | 8/2004 | Itoh et al. ............. 429/158 |
| 6,940,187 B2 | 9/2005 | Escobar et al. |
| 7,245,108 B2 * | 7/2007 | Chertok et al. ......... 320/132 |
| 7,363,520 B1 * | 4/2008 | Maier et al. ......... 713/300 |
| 7,378,818 B2 * | 5/2008 | Fowler et al. ......... 320/119 |
| 2003/0217300 A1 * | 11/2003 | Fukumori et al. ........ 713/300 |
| 2003/0227785 A1 | 12/2003 | Johnson, Jr. |
| 2004/0201933 A1 * | 10/2004 | Blanc ............... 361/93.1 |
| 2004/0240244 A1 * | 12/2004 | Yamamoto ............ 363/131 |
| 2005/0286274 A1 * | 12/2005 | Pfitzer et al. ............ 363/37 |
| 2006/0136757 A1 * | 6/2006 | Chen et al. ............. 713/300 |
| 2006/0167569 A1 * | 7/2006 | Colombi et al. .......... 700/22 |
| 2007/0029879 A1 * | 2/2007 | Eldredge ............. 307/18 |
| 2007/0159858 A1 * | 7/2007 | Spindler et al. .......... 363/37 |
| 2007/0210652 A1 | 9/2007 | Tracy et al. |
| 2008/0055947 A1 * | 3/2008 | Wen et al. .............. 363/65 |
| 2008/0136261 A1 * | 6/2008 | Mierta .............. 307/40 |

* cited by examiner

*Primary Examiner* — Rexford Barnie
*Assistant Examiner* — Justen Fauth
(74) *Attorney, Agent, or Firm* — Griffiths & Seaton PLLC

(57) ABSTRACT

A system for extending backup times using networks of direct current (DC) uninterruptible power supplies (UPS) is provided. A first DC UPS has a first input and a first output. A second DC UPS has a second input coupled to the first output of the first DC UPS, a second output coupled to at least one electrical load, and a third output coupled to the first input of the first DC UPS. Battery current from the first and second DC UPS is shared with the at least one electrical load in the event of a power loss.

22 Claims, 3 Drawing Sheets

EXTENDING BACKUP TIMES OF UNINTERRUPTIBLE POWER SUPPLIES

CROSS-REFERENCE TO RELATED APPLICATIONS

This application is related to U.S. Non-Provisional application Ser. Nos. 12/174,381, 12/174,386, and 12/174,388 filed concurrently herewith and incorporated herein by reference.

BACKGROUND OF THE INVENTION

1. Field of the Invention

The present invention relates in general to power supplies for electronic devices, and more particularly, but not exclusively, to methods and systems for extending backup times of uninterruptible power supplies (UPS) for use in computing environments.

2. Description of the Related Art

An uninterruptible power supply (UPS), also known as an uninterruptible power source, uninterruptible power system, continuous power supply (CPS), or a battery backup is a device which maintains a continuous supply of electrical power to connected equipment by supplying power from a separate source when utility power is not available. A UPS differs from an auxiliary power supply or standby generator, which generally does not provide instant protection from a momentary power interruption.

While not limited to safeguarding any particular type of equipment, a UPS is typically used to protect computers, telecommunications equipment, or other electrical equipment where an unexpected power disruption could cause injuries, business disruption, or data loss. UPS units range in size from units that will back up a single computer to units that will power entire data centers or buildings. UPS units include batteries or other energy storage devices that supply power to computer systems when utility power is lost.

The available backup time for a particular UPS is measured as a fixed value at the beginning of a backup event. This backup time period is related to the battery energy capacity, the state of charge, the efficiency of the power conversions electronics and the power drain of the electronic components requiring backup. The longer the backup time, the better. During this backup period, all power components can continue to function normally.

In a computer power system comprised of separate power components needing backup, and using separate backup UPS for each component, the backup period time for the system is set by the component with the shortest backup period time available. This is unfortunate since usually there is residual energy left elsewhere in the rack. Backed up computer components with lighter power drain can leave most of their energy unused, while computer components with heavier power demands drain their batteries.

SUMMARY OF THE INVENTION

In light of the foregoing, a need exists for a mechanism to extend overall backup time in environments such as the computing environment described above where a number of separate UPS devices are provided, and some of the separate UPS devices retain much of their energy due to lighter power drain.

Accordingly, in one embodiment, by way of example only, a system for extending backup times using networks of direct current (DC) uninterruptible power supplies (UPS) is provided. A first DC UPS has a first input and a first output. A second DC UPS has a second input coupled to the first output of the first DC UPS, a second output coupled to at least one electrical load, and a third output coupled to the first input of the first DC UPS. Battery current from the first and second DC UPS is shared with the at least one electrical load in the event of a power loss.

In an additional embodiment, again by way of example only, a system for extending backup times using networks of direct current (DC) uninterruptible power supplies (UPS) is provided. A plurality of interconnected DC UPS devices is provided. An output of a last device of the plurality of devices is coupled to an input of a first device of the plurality of UPS devices to form a loop. The battery current from each of the plurality of devices is shared with at least one electrical load coupled to one of the plurality of devices in the event of a power loss.

In an additional embodiment, again by way of example only, a method of manufacturing a system for extending backup times using networks of direct current (DC) uninterruptible power supplies (UPS) is provided. A first DC UPS having a first input and a first output is provided. A second DC UPS having a second input coupled to the first output of the first DC UPS is provided. A second output of the second DC UPS is coupled to at least one electrical load, and a third output of the second DC UPS is coupled to the first input of the first DC UPS. Battery current from the first and second DC UPS is shared with the at least one electrical load in the event of a power loss.

In still an additional embodiment, again by way of example only, a method of manufacturing a system for extending backup times using networks of direct current (DC) uninterruptible power supplies (UPS) is provided. A plurality of interconnected DC UPS devices is provided. An output of a last device of the plurality of devices is coupled to an input of a first device of the plurality of UPS devices to form a loop. The battery current from each of the plurality of devices is shared with at least one electrical load coupled to one of the plurality of devices in the event of a power loss.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for extending backup times using networks of uninterruptible power supplies (UPS). The embodiments share one or more electrical loads between interconnected UPS units. In this way, all the energy stored in multiple UPS units may be distributed to all electrical components requiring backup. A series of direct current uninterruptible power supplies (DC UPS) may be combined in specific network configurations (such as a loop configuration) to allow distribution of the available energy stored in all of the DC UPS units to all electrical loads requiring backup.

Figure 1:
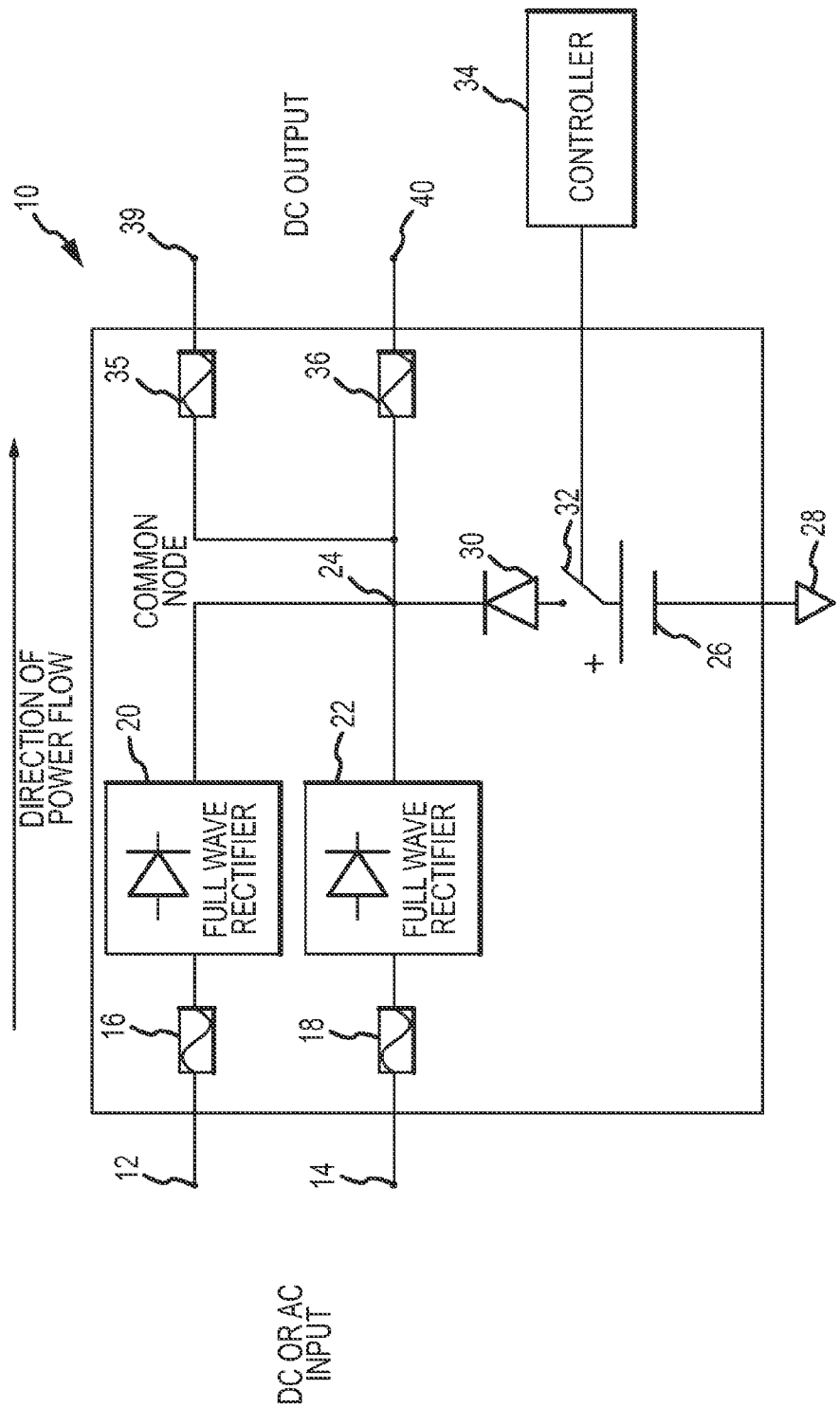
FIG. 1 is schematic diagram of an exemplary direct current uninterruptible power supply (DC UPS)

An example of DC UPS units that may be configured into a network that allows for extending backup times is illustrated in FIG. 1, following. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

DC UPS 10 is configured with a first DC or alternating current (AC) input 12. DC UPS 10 is also configured with a second DC or AC input 14. Inputs 12 and 14 may accept pure AC, rectified AC, or DC current. Input 12 may correspond to a first phase line input (e.g., A), while input 14 may correspond to a second phase line input (e.g., B). Circuit protection devices 16 and 18 are coupled to inputs 12 and 14. Circuit protection devices 16 and 18 may, as one skilled in the art will anticipate, vary for a particular implementation. For example, circuit protection devices 16 and 18 may include fuses, fuse elements, fusible links, circuit breakers, and the like as the skilled artisan will expect.

Input 12 is coupled through circuit protection device 16 to a rectifier. In the depicted example, a full wave rectifier 20 is implemented. Similarly, input 14 is coupled through circuit protection device 18 to full wave rectifier 22. Each full wave rectifier is coupled to common node 24, where rectified currents are combined. A battery 26 supplies backup current in the event of a power disruption. Battery 26 is coupled between ground 28 and a disconnect switch 32. Disconnect switch 32 is in turn coupled to a blocking diode 30. Disconnect switch 32 may be actuated by a controller 34. For example, disconnect switch 32 may be a relay or a similar device. Controller 34 may provide a control signal to the disconnect switch 32 upon a detection of a power disruption from one or more of the inputs 12 and 14. As one skilled in the art will expect, disconnect switch 32 may include transistor devices, such as metal oxide semiconductor field effect transistors (MOSFETs).

Circuit protection devices 35 and 36 are shown coupled to the common node 24, and correspond to one of two DC outputs 39 and 40. DC outputs 39 and 40 are adapted for connection to at least one electrical load, and/or adapted for connection to another DC UPS unit 10. Circuit protection devices 35 and 36 may again include fuse and circuit breaker devices as previously described to isolate load faults.

DC UPS 10 rectifies input currents (input 12 and input 14). The outputs of each of the rectified currents are combined at common node 24. Any phase differences between inputs 12 and 14 are intrinsically canceled as each phase input current is summed at the common node 24, producing a balanced DC output current that may be distributed to a single load, or shared between multiple loads.

DC UPS 10 uses a highly efficient and cost-effective method of intrinsic phase balancing. In addition, the method provides high energy density. There is no need for output synchronization or communication between multiple DC UPS units. Phases from differing power feeds may be combined. The intrinsic balancing operates from light to full load, and operates independently of changing load conditions. Assuming appropriate sizing of components internal to DC UPS 10 (such as rectifiers 20 and 22), phase balancing functionality may continue even in the event of a loss of one phase/phase line.

Figure 2:
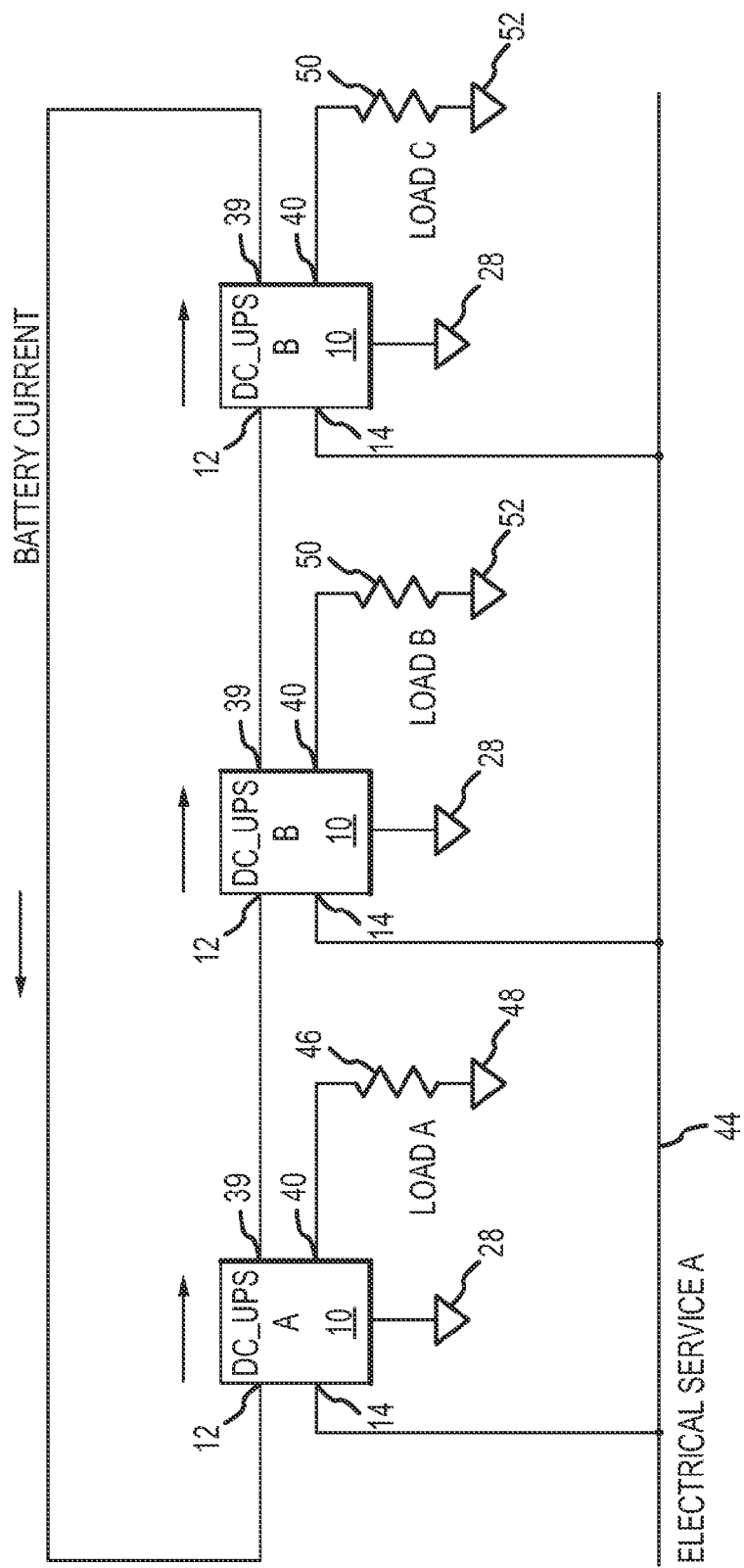
FIG. 2 is a schematic diagram of an exemplary network of interconnected DC UPS units to extend backup time.

An exemplary network 42 of interconnected DC UPS units 10 for extending backup time is illustrated in FIG. 2, following. The loop configuration shown in FIG. 2 may include two or more discrete DC UPS units 10 which are interconnected. In the instant embodiment, three interconnected DC UPS units 10 are shown. The output of each DC UPS leads to an input of a following DC UPS.

As is seen, each of the DC UPS units 10 are connected in a loop configuration that distributes energy from each battery to its local load and the other loads in the loop. The depicted configuration does not require inverter components, which keeps the power-pass-through efficiency high and reduces cost and package size. No synchronization or interconnection is required between the individual DC UPS units 10.

A first DC UPS unit 10 has inputs 12 and 14. Input 14 of the first DC UPS unit is coupled to an electrical service 44. Output 39 of the first DC UPS 10 unit is coupled to the input 12 of a second DC UPS unit 10. Output 40 of the first DC UPS 10 unit is coupled through a first electrical load 46 to ground 48.

Referring now to the second DC UPS unit 10, the input 14 also connected to the electrical service 44, while output 39 is coupled to a third DC UPS unit 10, and output 40 is coupled through a second electrical load 50 to ground 52.

To complete the loop configuration, the output 39 of the third DC UPS unit 10 is coupled to input 12 of the first DC UPS unit 10, while output 40 of the third DC UPS unit 10 is coupled through a third electrical load 51 to ground 53.

At the beginning of a battery backup event (such as a detected loss of utility power), the input power from electrical service 44 may no longer be available. The energy stored in each of the DC UPS batteries will supply all the power to the loads 46, 50, and 51. During the early part of the battery discharge, the battery currents may not be equal. However, the currents converge as the battery terminal voltage is reduced more quickly for batteries with higher current than lower current.

Figure 3:
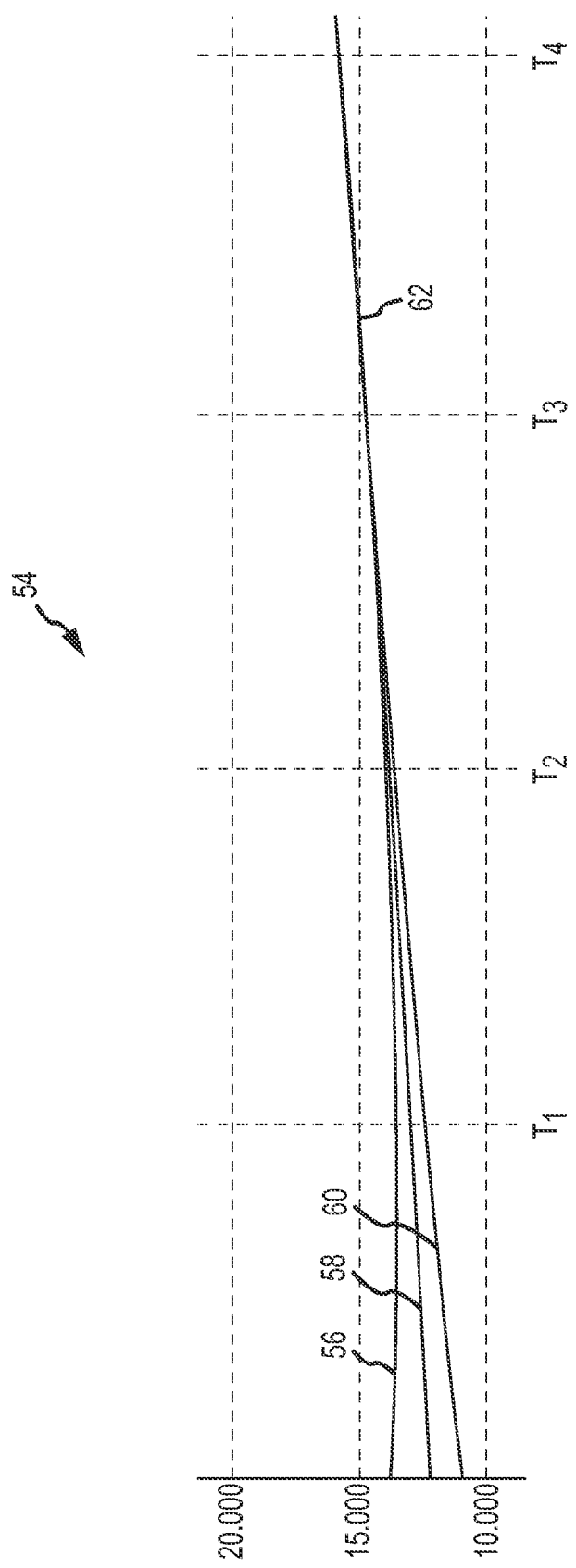
FIG. 3 is a graph illustrating current versus time during discharge of three networked DC UPS units in a loop configuration.

FIG. 3, following, illustrates exemplary battery current (in Amperes) along the Y-axis versus discharge time along the X-axis. At time $T_0$, when the battery backup event begins, currents 56, 58, and 60 (corresponding to battery output current of each of three discrete DC UPS devices) are not equal. Current 56 measures approximately 13.5 A, while current 58 measures approximately 12.5 A, and current 60 measures approximately 11.5 A. At time $T_1$ marking the passage of a period of time, the currents 56, 58, and 60 have begun to converge. By shortly after time $T_3$ marking the passage of an additional period of time, the currents converge at point 62 at approximately 15 A apiece. As the currents 56, 58, and 60 converge, battery energy is shared equally amongst the three discrete DC UPS units.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system for extending backup times using networks of direct current (DC) uninterruptible power supplies (UPS), comprising:
   a power supply;
   a first load;
   a second load;

a first DC UPS comprising a first power input, a second power input coupled to the power supply, a first power output, and a second power output coupled to the first load; and a second DC UPS comprising a third power input coupled to the power supply, a fourth power input coupled to the first power output, a third power output coupled to the second load, and a fourth power output coupled to the first power input and configured to supply power to the first DC UPS via the first power input, wherein:
the first power output is configured to supply power to the second DC UPS via the fourth power input,
power from the first DC UPS is shared with the second load in the event the power supply becomes unavailable, and
power from the second DC UPS is shared with the first load in the event the power supply becomes unavailable.

2. The system of claim 1, further comprising:
a third load; and
a third DC UPS comprising a fifth power input coupled to the power supply, a sixth power input coupled to the fourth power output, a fifth power output coupled to the third load, and a sixth power output coupled to the first input of the first DC UPS and configured to supply power to the first DC UPS via the first power output, rather than the fourth power output of the second DC UPS coupled to the first power input of the first DC UPS, wherein:
the fourth power output is configured to supply power to the third DC UPS via the sixth power input,
power from the second DC UPS is shared with the third load in the event the power supply becomes unavailable, and
power from the third DC UPS is shared with the first load in the event the power supply becomes unavailable.

3. The system of claim 1, wherein the first load and the second load are shared across the first DC UPS and the second DC UPS.

4. The system of claim 1, wherein the first DC UPS further comprises:
a first rectifier coupled to the first power input;
a second rectifier coupled to the second power input; and
a first common node coupled to the first rectifier and the second rectifier.

5. The system of claim 4, wherein the second DC UPS further comprises:
a third rectifier coupled to the third power input;
a fourth rectifier coupled to the fourth power input; and
a second common node coupled to the third rectifier and the fourth rectifier.

6. The system of claim 5, wherein the first DC UPS further includes:
a first battery coupled to the first common node, and
a first blocking diode coupled between the first battery and the first common node, and wherein the second DC UPS further includes:
a second battery coupled to the second common node, and
a second blocking diode coupled between the second battery and the second common node.

7. The system of claim 6, wherein the first DC UPS further comprises a first disconnect switch coupled between the first battery and the first common node, and the second DC UPS further comprises a second disconnect switch coupled between the second battery and the second common node.

8. A system for extending backup times using networks of direct current (DC) uninterruptible power supplies (UPS), comprising:
a power supply; and
a plurality of interconnected DC UPS devices each comprising a battery, a first power input, a second power input, a first power output, and a second power output, wherein:
the first power output of each DC UPS device is coupled to the first power input of a different DC UPS device to form a loop such that the first power output of each DC UPS device supplies power to a different DC UPS device via the first input of the different DC UPS device in the event the power supply becomes unavailable,
the second power input of each DC UPS device is coupled to the power supply, and
power from each of the plurality of DC UPS devices is shared with at least one electrical load coupled to the second power output of one of the plurality of DC UPS devices in the event the power supply becomes unavailable.

9. The system of claim 8, wherein each of the plurality of DC UPS devices comprises first and second rectifiers coupled to a common node.

10. The system of claim 9, wherein the first and second rectifiers are full wave rectifiers.

11. The system of claim 9 wherein each battery in each of the plurality of DC UPS devices is coupled to each respective common node.

12. The system of claim 11, wherein each of the plurality of DC UPS devices further includes a blocking diode coupled between the battery and the common node.

13. The system of claim 11, wherein each of the plurality of DC UPS devices further includes a disconnect switch coupled between the battery and the common node.

14. The system of claim 11, wherein each of the plurality of DC UPS devices further includes at least one of a first circuit protection device coupled to the common node, and a second circuit protection device coupled to the first and second rectifiers.

15. A method of manufacturing a system for extending backup times using networks of direct current (DC) uninterruptible power supplies (UPS), comprising:
providing a power supply;
providing a first load and a second load;
providing a first DC UPS comprising a first power input, a second power input, a first power output, and a second power output;
providing a second DC UPS comprising a third power input, a fourth power input, a third power output, and a fourth power output; and
coupling:
the first power input to the fourth power output,
the second power input to the power supply,
the third power input to the power supply,
the fourth power input to the first power output,
the second power output to the first load, and
the third power output to the second load, wherein:
the fourth power output is configured to supply power to the first DC UPS via the first power input,
the first power output is configured to supply power to the second DC UPS via the fourth power input,
power from the first DC UPS is shared with the second load in the event the power supply becomes unavailable, and power from the second DC UPS is shared with the first load in the event the power supply becomes unavailable.

16. The method of manufacture of claim 15, further comprising:
   providing a third load;
   providing a third DC UPS comprising a fifth power input, a sixth power input, a fifth power output and a sixth power output; and
   coupling:
      the fifth power input to the power supply,
      the sixth power input to the fourth power output,
      the fifth power output to the third load, and
      the sixth power output to the first power input, wherein:
         the sixth power output is configured to supply power to the first DC UPS via the first power output,
         the fourth power output is configured to supply power to the third DC UPS via the sixth power input,
         power from the second DC UPS is shared with the third load in the event the power supply becomes unavailable, and
         power from the third DC UPS is shared with the first load in the event the power supply becomes unavailable.

17. The method of manufacture of claim 15, wherein providing the first DC UPS further comprises:
   providing first and second rectifiers,
   providing a first common node,
   coupling the first rectifier to the first power input and to the first common node, and
   coupling the second rectifier to the second power input and to the first common node.

18. The method of manufacture of claim 17, wherein providing the second DC UPS further comprises:
   providing third and fourth rectifiers,
   providing a second common node,
   coupling the third rectifier to the third power input and the second common node, and
   coupling the fourth rectifier to the fourth power input and the second common node.

19. The method of manufacture of claim 18, wherein:
   providing the first DC UPS further comprises:
      providing a first battery,
      providing a first blocking diode,
      coupling the first battery to the first common node, and
      coupling the first blocking diode between the first battery and the first common node; and
   providing the second DC UPS further comprises:
      providing a second battery,
      providing a second blocking diode,
      coupling the second battery to the second common node, and
      coupling the second blocking diode between the second battery and the second common node.

20. A method of manufacturing a system for extending backup times using networks of direct current (DC) uninterruptible power supplies (UPS), comprising:
   providing a power supply; and
   providing a plurality of interconnected DC UPS devices each comprising a battery, first power input, a second power input, a first power output, and second power output, wherein:
      the first power output of each DC UPS device is coupled to the first power input of a different DC UPS device to form a loop such that the first power output of each DC UPS device supplies power to a different DC UPS device via the first input of the different DC UPS device in the event the power supply becomes unavailable,
      the second power input of each DC UPS device is coupled to the power supply, and
      power from each of the plurality of DC UPS devices is shared with at least one electrical load coupled to the second power output of one of the plurality of DC UPS devices in the event of a power loss the power supply becomes unavailable.

21. The method of manufacture of claim 20, further including providing first and second rectifiers coupled to a common node in each of the plurality of DC UPS devices.

22. The method of manufacture of claim 20, wherein each battery is coupled to a common node in each of the plurality of DC UPS devices.

* * * * *